US011383325B2

(12) United States Patent
Hammer et al.

(10) Patent No.: US 11,383,325 B2
(45) Date of Patent: Jul. 12, 2022

(54) METHOD FOR THE GENERATIVE PRODUCTION OF A COMPONENT, DEVICE FOR PERFORMING THE METHOD AND MOTOR VEHICLE

(71) Applicant: Volkswagen Aktiengesellschaft, Wolfsburg (DE)

(72) Inventors: Thorge Hammer, Tapenbeck (DE); Soeren Schiwy, Braunschweig (DE); Robert Stache, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 424 days.

(21) Appl. No.: 16/416,893

(22) Filed: May 20, 2019

(65) Prior Publication Data

US 2019/0351510 A1 Nov. 21, 2019

(30) Foreign Application Priority Data

May 18, 2018 (DE) ..................... 10 2018 112 129.6

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/034* (2013.01); *B23K 26/0608* (2013.01);
(Continued)

(58) Field of Classification Search
CPC ................ B23K 26/342; B23K 26/034; B23K 26/0608; B23K 26/0626; B23K 2101/006;
(Continued)

(56) References Cited

U.S. PATENT DOCUMENTS 5,540,677 A * 7/1996 Sinofsky .......... A61B 17/00491
606/8
5,609,780 A * 3/1997 Freedenberg ........ B23K 26/066
385/119
(Continued)

FOREIGN PATENT DOCUMENTS

DE 102013011675 A1 1/2015
DE 102013021891 A1 6/2015
(Continued)

*Primary Examiner* — John J Norton
*Assistant Examiner* — Simpson A Chen
(74) *Attorney, Agent, or Firm* — Muncy, Geissler, Olds & Lowe, P.C.

(57) ABSTRACT

The invention relates to a method for the generative production of at least one component, a device for performing the method and a motor vehicle, in particular a passenger car. In a method for the generative production of at least one component, a powder of a material is irradiated by means of laser radiation so that it is heated and at least partially melted and the molten material solidifies in order to at least partially form the component. Information relating to the temperature of the material irradiated and/or to be irradiated, in particular thermal radiation, is detected and used for influencing the laser intensity. The laser radiation is conducted at least in sections by means of a light guide to the material and the information relating to the temperature is transmitted in the inner region of the light guide for the purpose of its detection.

5 Claims, 9 Drawing Sheets

(51) Int. Cl.
*B33Y 30/00* (2015.01)
*B23K 26/03* (2006.01)
*B33Y 50/02* (2015.01)
*H01S 3/067* (2006.01)
*G02B 6/02* (2006.01)
*B23K 26/06* (2014.01)
*B23K 101/00* (2006.01)
*B33Y 70/00* (2020.01)

(52) U.S. Cl.
CPC .......... *B23K 26/0626* (2013.01); *B33Y 10/00* (2014.12); *B33Y 30/00* (2014.12); *B33Y 50/02* (2014.12); *G02B 6/02328* (2013.01); *H01S 3/067* (2013.01); *B33Y 70/00* (2014.12)

(58) Field of Classification Search
CPC ......... B33Y 10/00; B33Y 30/00; B33Y 50/02; B33Y 70/00; H01S 3/094003–094096; H01S 3/0941; H01S 3/067; H01S 3/06708–06745; G02B 6/00; G02B 6/02304; G02B 6/0096; G02B 6/02328; G02B 6/023; G02B 6/02319
USPC .......................................................... 219/76.1
See application file for complete search history.

(56) References Cited

U.S. PATENT DOCUMENTS

| | | | |
|---|---|---|---|
| 6,932,809 B2* | 8/2005 | Sinofsky | A61B 18/20 606/12 |
| 10,093,065 B2 | 10/2018 | Ederer et al. | |
| 10,862,262 B2* | 12/2020 | Kajiwara | H01S 3/1305 |
| 2010/0068673 A1* | 3/2010 | Yamada | G01N 21/474 433/29 |
| 2011/0155709 A1* | 6/2011 | Yamada | G02B 6/04 219/121.85 |
| 2016/0175935 A1 | 6/2016 | Ladewig et al. | |
| 2017/0361405 A1 | 12/2017 | Renz et al. | |
| 2018/0133801 A1 | 5/2018 | Buller et al. | |
| 2019/0009369 A1* | 1/2019 | Vorontsov | B23K 26/342 |
| 2021/0162505 A1* | 6/2021 | Narita | B22F 10/38 |

FOREIGN PATENT DOCUMENTS

| | | |
|---|---|---|
| DE | 102015103127 A1 | 9/2016 |
| EP | 3034205 A2 | 6/2016 |

* cited by examiner

METHOD FOR THE GENERATIVE PRODUCTION OF A COMPONENT, DEVICE FOR PERFORMING THE METHOD AND MOTOR VEHICLE

This nonprovisional application claims priority under 35 U.S.C. § 119(a) to German Patent Application No. 10 2018 112 129.6, which was filed in Germany on May 18, 2018, and which is herein incorporated by reference.

BACKGROUND OF THE INVENTION

Field of the Invention

The invention relates to a method for the generative production of at least one component, a device for performing the method and a motor vehicle, in particular a passenger car.

Description of the Background Art

Generative manufacturing methods, also known as additive manufacturing methods, have found their way into various areas of industrial production due to numerous advantages. In particular, the flexibility of these methods, which make it possible to manufacture components without moulds and can thus be used for the manufacture of new or modified components without expensive or time-consuming modifications, qualifies them for a wide range of applications.

In the powder bed processes, a layer-by-layer build-up takes place in which a powder layer is applied and the individual powder particles are joined locally. In selective laser melting, for example, this is done by local melting using laser radiation. In binder jetting, on the other hand, the particles are bonded together using a binder and the component is produced in this way. A common feature of these processes is that a surface of a powder bed is processed in certain areas in order to join the powder particles. The loose powder from unprocessed areas can be used to support the following powder layers to be joined and is typically removed again after production of the component. Using such processes, components with overhangs of up to 15° can be produced.

In the methods known so far, the powder bed is lowered by one layer height and a further layer of loose powder is applied after the powder particles of one layer have been joined.

DE 10 2013 011 675 A1 describes a method for generative component production in which a powdery material is melted in layers by means of laser radiation. This is also referred to as selective laser melting. The intensity of the laser radiation can be varied spatially and/or temporally within the working plane. In a first area the intensity is set in such a way that the melting temperature of the material is reached or exceeded. In several second areas outside the first area, respectively, a lower intensity is set. The intensities can be set independently of each other. In particular, the material can be preheated before melting.

EP 3 034 205 A2 discloses a device for the generative production of a component on a construction surface with a coater for producing a powder layer and a laser for local melting of the powder layer. The device also comprises a deflecting device for deflecting the laser beam to different areas of the powder layer or for focusing the laser beam, and a compensating device for aligning the construction surface and a focus surface of the laser beam with respect to each other. This enables the correction of a focus position that has been displaced during the production process and thus serves to adjust the desired local energy density of the laser beam. For example, a measuring system can be arranged in the beam path of the laser to map the shape and size of the laser spot and determine whether the laser is focused. The deflector can include an F-theta lens to provide a planar focal plane.

DE 10 2015 103 127 A1 describes a laser-based irradiation system for a device for generative manufacturing with a first beam source and a second beam source. The irradiation system also comprises a common scanner optic for focusing the two laser beams and a beam combiner for superimposing the two beams. This allows split laser beams or different laser beams to be coupled into a single transport fiber and to be jointly moved over an area of the powder layer to be melted using scanner optics. Radiation from a ring-shaped fiber sheath of a transport fiber, which has a larger focus diameter, can heat a large area of the powder to a temperature close to the melting point and the laser beam from the fiber core of the transport fiber serves to melt the powder.

In other 3-D printers known to date for the production of metal components, several laser scanner units with respective laser sources share the surface of a powder bed and are thus able to produce areas of components to be produced together or separate components. This is how brake calipers, for example, are manufactured. Here the speed can be significantly increased, as several laser scanner units can produce one component at the same time. The disadvantage is that all scanners must have completed the production of their assigned area before a new powder layer can be applied and the process begins again.

SUMMARY OF THE INVENTION

The task of the invention is to provide a method and a device by means of which the generative production of at least one component is possible in a particularly simple and cost-effective manner.

The problem is solved by the method for the generative production of at least one component according to claim 1 as well as by the device for performing the method according to claim 4. Embodiments of the method are indicated in subclaims 2 and 3, embodiments of the device are indicated in subclaims 5-9. Furthermore, a motor vehicle, in particular a passenger car, according to claim 10 is provided.

A first aspect of the invention is a method for the generative production of at least one component. A powder of a material is irradiated by means of laser radiation so that it is heated and at least partially melted and the molten material solidifies in order to at least partially form the component. Information relating to the temperature of the material irradiated and/or to be irradiated, in particular thermal radiation, is detected and used for influencing the laser intensity.

The laser radiation is conducted at least in sections by means of a light guide to the material and the information relating to the temperature is transmitted in the inner region of the light guide for the purpose of its detection.

A powder in the sense of the invention is a material in the form of solid particles. The particle size is typically 0.5 mm. However, granular substances and/or mixtures of substances with larger particles can also be used. In particular, metallic materials are used. However, the invention is not limited to this, since thermal plastics and/or plastic-coated metal particles, as they are known from the Binderjet process, can also be processed. The latter are sintered in a furnace at higher temperatures, particularly after the layered build-up of the component, in which the plastic is at least partially melted to mechanically bond the individual powder grains, in order to produce a metallic structure with a higher strength.

Typically, powder arranged in a layer and/or powder forming a surface is partially melted. This means that only areas of the layer are melted so that only in the melted areas the component is produced, and other areas of the layer are not melted and thus remain as powder. The at least partial melting of the powder may also mean that individual particles of the material are only partially melted, especially in the respective peripheral areas of the particles, so that there is no continuous liquid phase. In this way it is also possible to fuse the individual particles together to form an essentially solid layer. In other words, individual particles can be completely melted, individual particles can be partially melted, for example in peripheral areas, and/or individual particles cannot be melted or remain solid.

When the area is irradiated with laser radiation, it heats the powder in the area so that it is at least partially melted. To this end, laser radiation is directed onto a surface of the powder, forming an impact point. In this process, the surface and, if applicable, the powder beneath it are heated or melted. Of course, the impact point is not a point in the mathematical sense but rather an impact surface, which is also referred to as the focus field, focus point or focus spot of the laser radiation. An impact point in the sense of the invention means the area where radiation strikes a surface and does not necessarily mean that there is a focus or focal point of an optical element or system at this point.

In particular, the method according to the invention describes a method for selective laser melting, typically abbreviated as SLM.

In particular, the method also includes the application of powder in order to produce a powder bed. A uniform surface can be produced, for example using a scraper, to ensure uniform irradiation of the powder with laser radiation. After solidification of the previously melted powder in the area, a new application of powder is carried out.

The inner region of the light guide is designed to transmit or conduct information regarding temperature, for example thermal radiation. For example, the inner region can be hollow, so that the thermal radiation is conducted through the gas, gas mixture or air contained in it, whereby the inner region is limited in particular by a glass surface which is designed to reflect the thermal radiation, so that the thermal radiation can be conducted in the inner region. In particular, the light guide and its inner region have the same length so that the conducting of the laser radiation and the transmission of the information take place along the same path.

The thermal radiation is electromagnetic radiation generated by the material irradiated and/or to be irradiated and is also referred to as thermal reflection.

The laser radiation is conducted by means of a light guide along at least one section of the path from a laser source to the surface of the material to be irradiated. It is led to the material for the purpose of irradiation. This means that the distance to be covered by the laser radiation from the laser source to the impact point on the powder is not necessarily completely realized by the light guide.

The information relating to the temperature is transmitted along at least a portion of the path from the surface of the material to be irradiated to a detection means in the inner region of the light guide. The transmission of the information takes place in the opposite direction to the conduction of the laser radiation.

The laser intensity is controlled or closed-loop controlled on the basis of the temperature of the material irradiated and/or to be irradiated. This can be solid and/or powdery, at least partially liquid and/or solidified. The laser intensity means the intensity of the laser radiation of the laser source or laser sources that irradiates or irradiate the area of the surface. It is also referred to as surface power density and describes the power of the laser radiation related to the area of the impact point.

The detection of the information in particular comprises the recording of the information and the transfer of a suitable signal in order to influence the laser intensity.

The temperature information is detected, for example, to prevent the powder or molten material from overheating. In other words, the impact point of the laser source and/or the irradiated material is thermally monitored. For example, if an upper limit is exceeded, the laser intensity can be reduced and/or if a lower limit is fallen below, the laser intensity can be increased. The influence on the laser intensity can include switching off the laser source. In particular, overheating of the material is prevented. In this way, there is no evaporation or bursting of powder particles or tearing of the powder layer, as is known when the temperature is not monitored accurately or not at all. Also movements of the powder, which can result for example from high local temperature gradients, are prevented.

It can be seen that the use of the inner region of the light guide to transmit the information allows a particularly accurate feedback, since in this way a signal, in particular the thermal reflection of the area irradiated at that moment, can be detected. In other words, one advantage is the accurate mapping of the impact point, which results in less interference from adjacent areas of the area irradiated and/or to be irradiated. In addition, the solution according to the invention can reduce the complexity and thus the costs of a device for carrying out the method, since those optical elements which are used for deflecting or refracting the laser radiation, for example for its guidance over the powder surface and/or for uniform irradiation of the powder surface, can equally be used for deflecting or refracting the thermal radiation.

In one embodiment of the method, the laser radiation and the information relating to the temperature are influenced, in particular refracted and/or deflected, by means of at least one common optical element, so that they have the same beam path at least in sections. In this case, the radiation direction is opposite. The common optical element can, for example, comprise a lens, a mirror and/or an optical scanning device.

A further embodiment of the method for the generative production of at least one component is characterized in that the first and second laser sources are mapped by means of plane field optics onto a substantially flat surface of the powder.

In other words, the laser radiation output by a particular laser source is mapped onto the surface of the powder by means of plane field optics. One plane field optic can be used for several or all laser sources. A flat surface in the sense of the invention means a surface running along a plane that is not curved. In other words, the laser radiation is influenced in such a way that the surface of the powder is irradiated essentially uniformly.

Plane field optics are used to focus the laser radiation onto a flat surface and comprise at least one lens or at least one lens system. This minimizes the curvature of the image field when the laser radiation is mapped onto the flat surface of the powder bed. Various types of plane field optics are also known as F-theta optics, scan optics or flat field optics. In particular, plane field optics also serve to deflect information, in particular thermal radiation, for the purpose of transmitting it to the detection device.

This has the advantage of a particularly uniform irradiation of the area or different areas of the powder and thus enables a particularly high quality of the manufactured component.

In a further embodiment of the method, the laser radiation is guided over the powder by means of an optical scanning device, in particular a rotating polygon mirror. In the case of a rotating polygon mirror, in particular, the rotation axis is aligned parallel to a feed direction of the powder.

In other words, the optical scanning device, also referred to as the scanning unit, is used to map the laser radiation onto the surface of the powder. This serves a controllable and especially uniform irradiation of the surface of the powder. The guiding of the laser radiation over the powder is also called scanning. In particular, an impact point of the laser radiation is guided over the powder. In particular, the rotating polygon mirror also serves to deflect the information, in particular the thermal radiation, for the purpose of transmitting it to the detection device.

A rotating polygon mirror has a cross-section in the form of a regular polygon, so that each of the outer surfaces which are angled to each other can guide the laser radiation over the powder along a path. In this way, a large number of scanning operations are possible with each rotation of the polygon mirror.

With a rotation axis aligned parallel to the feed direction of the powder, the laser radiation is guided perpendicular to the feed direction of the powder and in particular along linear paths over its surface and the surface is scanned along such paths for the purpose of transmitting the respective information for their detection.

This embodiment of the invention allows scalability of the device to perform the method at higher feed rates and higher laser powers. Thus, the method can be operated in an advantageous way with higher feed rates and higher laser powers, which enables a particularly fast and efficient production of components.

One embodiment of the method for the generative production of at least one component is characterized in that the detection of the information and the irradiation of the material take place simultaneously at least for certain periods of time.

In other words, the information is detected during irradiation. This has the advantage that a closed-loop control of the laser intensity or laser power is possible without any time delay, especially in real time.

In one embodiment of the method for the generative production of at least one component, the material is moved along a feed direction simultaneously with the irradiation at least for certain periods of time. In particular, the movement takes place relative to a laser source for outputting the laser radiation and/or to the light guide and/or to the conductor and output device.

Typically, the powder is moved linearly. It can, for example, be arranged on a conveyor belt to be moved by it in relation to the laser sources and, if necessary, in relation to other parts of the device for performing the method. Of course, the powder can also be moved in time periods without irradiation.

In other words, a continuous method is provided for the generative production of at least one component. This enables a particularly fast and cost-effective production of components.

One embodiment of the method for the generative production of at least one component is characterized in that the material is irradiated simultaneously and/or successively in time at least for certain periods of time by means of respective laser radiation of at least two laser sources. Information relating to the temperature of the respectively irradiated material is detected and used for influencing the respective laser intensity simultaneously with the irradiation at least for certain periods of time.

One embodiment of the method for the generative production of at least one component is characterized in that the material is irradiated simultaneously and/or successively in time at least for certain periods of time by means of respective laser radiation of at least two laser sources. At least for certain periods of time at the same time as such irradiation, information relating to the temperature of the respectively irradiated material is detected and used for influencing the respective laser intensity.

For example, several laser sources are combined in one laser unit for simultaneous irradiation. Simultaneous irradiation with these can be used, for example, to cumulate the radiation power of low-cost laser sources and in this way provide an overall high radiation power for irradiating the material in a simple and cost-effective way. For this purpose, several laser sources can be coupled into one conductor and output device so that their respective laser radiation superimposes. In this case in particular, the laser unit is assigned a detection device by means of which the laser intensity of each laser source can be influenced or closed-loop controlled independently of the other laser sources or together with the other laser sources. Typically, the laser unit is assigned a light guide and/or a conductor and output device for conducting the laser radiation of all laser sources of the laser unit at least in sections.

In the case of irradiation in succession in time by means of several laser sources, at least one area of the powder is irradiated with laser radiation output by means of at least one first laser source and subsequently with laser radiation output by means of at least one second laser source. In this way, the area is heated and/or melted in several steps. In this way, particularly simple irradiation is possible.

In particular, the laser sources are arranged such that they are adapted to output laser radiation at different positions along the feed direction so that, when the powder moves along the feed direction, the area of the powder can be irradiated by means of the laser sources successively in time.

The two laser sources can be arranged at different positions along the feed direction. Typically, each laser source, i.e. at least the first and second laser sources, is connected to an output device for outputting laser radiation, in particular a light guide such as an optical fiber for conducting and outputting the laser radiation, the output device or the end of the respective light guide being configured to output the laser radiation.

In particular, the output devices, such as the light guides or their ends, are arranged at different positions in relation to the feed direction. They can be stationary. In other words, the powder is moved along output devices arranged one behind the other, so that an area of the powder is irradiated successively in time series by means of laser radiation output by the output devices. In this way, the temperature is increased in several steps in continuous operation. This makes it particularly easy to perform the method according to the invention. The described arrangement can also be arranged in the device for performing the method, which is therefore particularly simple and inexpensive to manufacture. It also has the advantage that the impact point of each laser source or laser unit is thermally monitored independently of any other laser sources or laser units present.

One embodiment of the method for the generative production of at least one component is characterized in that an adjacent area of the powder, which is located adjacent to an area which is melted or to be melted in order to form the component, is heated. This is done in particular by irradiation with laser radiation. Heating minimizes the dissipation of heat from the powder to be melted or melted by reducing temperature differences between the powder to be melted or melted and the adjacent area of the powder.

Heating of the adjacent area is carried out in particular by means of at least one first and/or at least one second laser source. In particular, it is performed by multiple successive irradiations with laser radiation. Alternatively or in addition, another method of heating can be used. For example, the entire powder bed and/or other parts of the device can be heated by realizing a warm atmosphere.

By minimizing the temperature difference between the powder to be melted or melted and the adjacent area and the associated minimization of heat dissipation, the overall temperature of the powder bed and/or the component to be manufactured is increased. In other words, heat accumulation is generated. This has the advantage that the thermal deformation resulting from the volume shrinkage of the solidifying or cooling material is minimized. Cooling is slowed down and becomes more uniform. As a result, the stress arising in the component, in particular tensile stress as known from conventional processes, is minimized. In one embodiment of the method, the powder is thermally insulated. In this way, the cooling of the powder is slowed down and homogenized.

In particular, when the adjacent area is irradiated, information relating to the temperature of the irradiated adjacent area is detected and used to influence the laser intensity. A transmission of this information typically takes place, as described, in the inner region of a suitably configured light guide. In this way, adjacent areas can also be thermally monitored, which enables an increase in process speed and the production of particularly complex shapes by reducing temperature gradients and thus minimizing thermal distortion or stresses in the component to be produced.

A further embodiment of the method for the generative production of at least one component is characterized in that irradiation of a first area of the powder of the material arranged in a first plane takes place. Simultaneously at least for certain periods of time, a powder of a material is applied in a second plane spaced from the first plane to a second area of the material arranged in the first plane which has previously been at least partially melted and, in particular, solidified again, and is heated by means of laser radiation and at least partially melted. In this way, several planes of a component are formed simultaneously. In particular, a transmission of respective information relating to the temperature of the respective irradiated area is effected simultaneously with each irradiation, at least for certain periods of time, in inner regions of respective light guides.

In particular, the first and second planes are aligned parallel to each other. Typically, the same material is applied in the second plane as in the first plane.

In one embodiment of the method, powder is applied, heated and at least partially melted simultaneously at least for certain periods of time in at least ten planes, in particular at least fifty planes, and in one embodiment in at least one hundred planes.

In particular, a distance measured along a feed direction of the powder between an impact point of the laser radiation on the first area of the powder and an impact point of the laser radiation on the powder applied to the second area is less than 10 cm, in particular less than 3 cm. This can be achieved by the high quality of the laser radiation that can be realized by means of the method according to the invention, i.e. by the high beam grade or beam quality as well as, if applicable, by high-quality polygon mirrors and long focal lengths of the lenses used. In this way, a device for performing the method, by means of which components consisting of several hundred layers can be produced, can be built in a comparatively small space and/or with a comparatively short distance. Also, due to the spatial proximity of the effective areas of the individual laser sources, which is associated with rapid successive irradiations by the individual laser sources in the continuous method, heat gradients between individual areas of the component to be produced and/or the powder bed are reduced, so that slow and uniform cooling can take place, which minimizes thermal deformation as described.

In particular, the powder application is performed in a thickness between 50 µm and 1 mm. In one embodiment, a layer thickness between 50 µm and 1 mm is produced.

In other words, several parallel planes of at least one component are produced simultaneously for at least certain periods of time. A continuous, step-like production of several layers of at least one component takes place. In this way, an entire component or a large number of components can be completely manufactured in a continuous process. The advantages of slow and uniform cooling, which have already been described, are particularly evident here.

In addition, the rapid execution of a continuous method for the generative production of at least one component minimizes thermal distortion, so that components of higher quality can be produced particularly easily.

In one embodiment, the solidified material of the second area of the first plane has a temperature between 500° C. and 1500° C., in particular between 700° C. and 1000° C., when the powder is applied in the second plane. In comparison with conventional methods for the generative production of at least one component, in which each molten layer cools down to a large extent before the application of a further powder layer, the thermal deformation caused by volume shrinkage and thus the tensile stresses remaining in the component or introduced into the component are minimized in this way in the method according to the invention. In other words, a heat accumulation involving several printed layers is realized, which enables slow and uniform cooling.

A second aspect of the invention is a device for performing the method according to the invention. It comprises a laser unit with at least one laser source for irradiating a powder of a material by means of laser radiation in order to heat and at least partially melt the powder. The device further comprises a detection device assigned to the laser unit for detecting information relating to the temperature of the material irradiated and/or to be irradiated by the laser unit, in particular thermal radiation, for the purpose of influencing the laser intensity. In addition, the device comprises a light guide assigned to the laser unit for conducting the laser radiation at least in sections to the material, wherein an inner region of the light guide is configured to transmit the information relating to the temperature at least in sections from the material to the detection device.

In particular, the laser unit comprises a plurality of laser sources for simultaneously irradiating the powder; the detection means being arranged to detect information of the material irradiated by the laser sources. The detection device is also referred to as the analyzer. The two laser sources or all laser sources of a laser unit can be set up to output laser radiation at different positions along the feed direction.

The laser sources of a laser unit do not necessarily have to be mechanically coupled or coupled for control purposes, but can be completely independent of each other.

Typically, laser sources of the same type are used as the first, second and possibly third and possibly further laser sources. Pigtail diode lasers can be used. These are powerful diode lasers which are connected to a conductor and output device such as an optical fiber for conducting and outputting the laser radiation. It is also possible to use other fiber lasers and/or lasers coupled with a conductor and output device. In this way, comparatively inexpensive lasers can be used to increase the temperature up to and including the melting of particularly metallic materials. Furthermore, the laser sources described have the advantage that they achieve high radiation power with comparatively little installation space.

The light guide connected to the laser source is in particular configured to transmit information relating to temperature in an inner region and/or to be connected to a suitable light guide configured to transmit information relating to temperature in its inner region. The end or face of the respective light guide is suitable for outputting the respective laser radiation. The inner region of the light guide is configured to transmit or pass on the information.

In particular, the light guide and its inner region are arranged in a common conductor and output device for conducting and outputting the laser radiation and for transmitting the information. In one configuration, a light guide and a heat guide are arranged in a common conductor and output device.

The detection device may comprise a sensor for receiving information, e.g. thermal radiation.

In particular, the device comprises an optical element for influencing the laser radiation and the information relating to the temperature. The optical element may comprise, for example, a lens or a mirror for refracting and/or deflecting the laser radiation and the information. In particular, it serves to simultaneously influence the laser radiation and the information.

The device may further include a receiving device for receiving the powder. The device may also comprise a moving device for the particularly linear movement of the powder along a feed direction. This can be realized as a conveyor belt. The device may also comprise an applicator device for applying the powder for the purpose of its arrangement on a receiving device and/or on previously at least partially melted and in particular solidified material.

The device according to the invention is simple and cost-effective and serves the particularly efficient generative production of components.

In one embodiment of the device, it has a plurality of laser units for irradiating the material simultaneously and/or successively in time, a plurality of detection devices and a plurality of light guides. A detection device and a light guide, respectively, are assigned to at least two, and in particular all, of the laser units. Each light guide is configured to transmit the information in its inner region. In this way, the impact points, which are realized by the laser radiation of each laser unit, can be thermally monitored individually.

Each laser unit has at least one laser source. The detection device assigned to each laser unit serves to detect information about the material irradiated with this laser unit, i.e. in particular with all laser sources of this laser unit. This embodiment has the advantage that a large number of laser sources can be combined in order to heat or melt the material successively, for example in several steps, and/or to irradiate several areas of the powder simultaneously and thus produce several areas of the component, whereby all laser units can be thermally monitored.

In one embodiment of the device for performing the method, the light guide is part of a conductor and output device for conducting and outputting the laser radiation, wherein the conductor and output device comprises, in coaxial arrangement, the light guide and its inner region. In this way, an area of the material can be irradiated by means of laser radiation transmitted via the light guide and thermal radiation from the same area can be transmitted to the detection device by means of the inner region of the light guide.

In other words, the light guide has a circular cross-section for conducting the laser radiation, the inner region of which has a circular cross-section and is configured for transmitting the information.

This embodiment has the advantage that a particularly precise control or closed-loop control of the laser intensity is possible, since the reflection of the irradiated area is directly detected and used for thermal monitoring. Especially with a large number of laser sources or light guides for outputting laser radiation a finely resolved thermal monitoring can be realized, which ensures a consistently high quality of the manufactured components.

In one embodiment of the device, the inner region of the light guide is configured as a glass body or as hollow space and, in particular, is delimited by a glass surface.

In the configuration as a hollow space, also called a hollow core, the air or gas or gas mixture present in the inner region of the light guide is configured to transmit thermal radiation, which due to its wavelength is not suitable for transmission through known glass fibers. It has been shown that thermal radiation in the infrared wavelength range between 3 µm and 5 µm on the one hand allows particularly good conclusions to be drawn about the surface temperature of the irradiated material and on the other hand has a proportionality to the surface temperature and thus enables particularly easy evaluation of the detected signal. However, thermal radiation with this wavelength is shielded by known glass fibers, since conventional glass has a very low transmission in this range.

In the embodiment as a glass body, a glass is used which is suitable for the transmission of such wavelength ranges. In this case the material of the inner part of the light guide has a different refractive index than the light guide itself. This embodiment is also called dual core fiber. The light guide, including its inner region, can be realized as a solid glass body.

In both cases, a glass surface delimiting the inner region of the light guide serves to reflect the thermal radiation and thus its conduction towards the detection device.

This embodiment has the advantage that the conduction of the laser radiation and the information can be realized in a particularly simple and cost-effective way.

A further embodiment of the device for performing the method is characterized in that the light guide comprises a photonic crystal fiber for conducting the laser radiation.

A photonic crystal fiber in the sense of the invention means a fiber that is essentially transparent along a light conducting direction and has structures with a refractive index, so that the movement of light during a passage of the fiber is influenced by diffraction and/or interference. For example, a photonic crystal fiber can be crossed by channels or hollow spaces running essentially along the direction of the light guide. These can be arranged around a core, in particular rotationally symmetrically.

The laser radiation is conducted through a body of the photonic crystal fiber and refracted or reflected by the channels for this purpose. The core of the photonic crystal fiber can be hollow, allowing coaxial heat transmission inside the photonic crystal fiber.

One embodiment of the device is characterized in that the device comprises several generation devices for the generative production of a material layer of at least one component. Each generation device comprises an application device for applying the powder for the purpose of arranging the powder, in particular to a receiving device and/or to previously at least partially melted and in particular solidified material, at least one laser unit and a detection device, associated with each laser unit, as well as a conductor and output device.

A receiving device for receiving the powder can be arranged to move along a feed direction. In particular, the generation units are arranged one behind the other along the feed direction of the powder.

Each generation unit can further have a plane field optic to deflect the laser radiation for the purpose of uniform irradiation of an essentially flat surface of the powder. Each generation device can have a rotatably arranged polygon mirror for guiding the laser radiation over the powder and/or for mapping the laser radiation on the surface of the powder, whereby the rotation axis of the polygon mirror is aligned in particular parallel to a feed direction of the powder.

In particular, each generation device serves to apply, at least partially melt and solidify a layer of powder so that a layer of the component is produced. The number of generation units thus corresponds to the number of layers that can be produced. In one embodiment the device has at least ten, in particular at least fifty, and in one embodiment in at least one hundred generation devices which are arranged one behind the other along the feed direction. In other words, a device is provided for the continuous generative production of at least one component. This enables in an advantageous way a particularly fast and cost-effective production of components.

Another embodiment of the device is characterized in that the device has a control and/or regulating device for influencing and/or closed-loop control of the laser intensity taking into account information detected by the detection device.

In particular, it is configured as a closed-loop control device which is or can be operatively connected to the detection device and to the laser source for closed-loop control of the laser intensity on the basis of the detected information. In this way, the device is set up for automatic monitoring or closed-loop control of the laser intensity or laser intensities of the laser source or laser sources. This enables a particularly cost-effective and simple production of components.

A third aspect of the invention is a motor vehicle, in particular a passenger car. This comprises at least one component produced with the method according to the invention. In particular, it is a metal component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
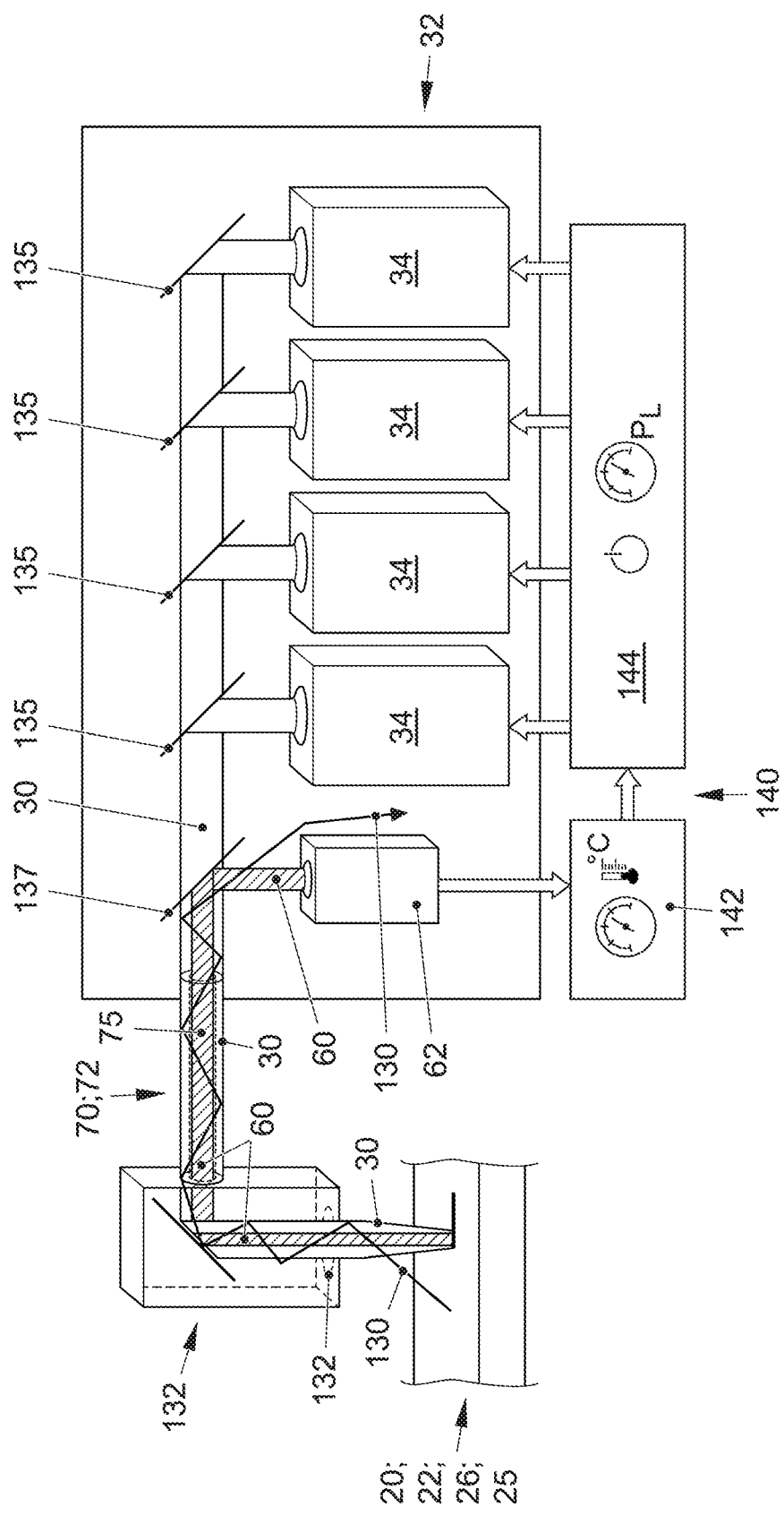
FIG. 1: a schematic representation of an embodiment of a device.

FIG. 1 shows a part of an embodiment of a device for the generative production of at least one component. The respective laser radiation 30 from four laser sources 34 is superimposed in order to irradiate an area 25 of a powder 20 of a material 22 arranged in a plane and/or its surface 26 and in this way to heat and at least partially melt it. After completion of the irradiation by means of the laser radiation 30, the molten material 22 solidifies to at least partially form at least one component.

The laser unit 32 shown comprises four laser sources 34 arranged linearly one behind the other, wherein respective mirrors 135 are arranged in such a way that the respective laser radiation 30 is superimposed in the direction of the powder 20 to be irradiated and thus the cumulated laser radiation 30 of all laser sources 34 impinges simultaneously on the powder 20. In this way, a large number of lower-dimensioned laser sources 34 can be used to achieve a high total radiation output. The superimposed laser radiation 30 is deflected and focused by means of optical elements 132, namely a mirror and a converging lens.

A conductor and output device 70, namely a light guide 72 having a circular cross section, is shown, through which the laser radiation 30 is conducted in sections to the material 22. At the end of the conductor and output device 70 shown on the left, the laser radiation exits the conductor and output device 70 for deflection and/or focusing by means of optical elements 132. At the end shown on the right, the laser radiation 30 of all four laser sources 34 enters the conductor and output device 70. Such a superposition of several laser sources 34 or their respective laser radiation 30 can be realized with each of the light guide 72 and/or conductor and output device 70 described below.

In the inner region 75 of the light guide 72, information relating to the temperature of the irradiated material 22, namely thermal radiation 60, is transmitted in the direction opposite to the laser radiation 30. This radiates from the surface 26 irradiated by laser radiation 30, passes through the same optical elements 132 as the laser radiation and is directed by means of a further mirror 137 to a detection device 62. The latter serves to detect the thermal radiation 60 in order to influence the laser intensity.

For this purpose, both the detection device 62 and the laser sources 34 are connected to a control and/or regulating device 140 which comprises a temperature evaluation device 142 as well as a laser source control 144. For the purpose of evaluating the temperature prevailing on the surface 26, the detection device 62 is in control connection with the temperature evaluation device 142. The latter outputs corresponding signals to the laser source control 144, which is set up to influence one or more laser sources 34 with regard to their respective laser intensity on the basis of the signals received. In this way, a too high or too low irradiation can be detected and compensated accordingly.

Furthermore, a signal of interference radiation 130 is represented, which is radiated from an area adjacent to the irradiated area 25 of the surface 26 and is also refracted and/or deflected by the optical elements 133, the light guide 72 and the mirror 137. However, it is evident that the interference radiation 130 is not detected by the detection device 62 and therefore has no influence on the laser intensity. In other words, only the temperature signal from the center of the impact point hits the detection device 62 and is used to influence the laser intensity. The suitable configuration of the optical elements 132, the mirror 137 and the detection device 62 ensures that no interfering radiation 130 impedes such closed-loop control of the laser intensity.

Figure 2:
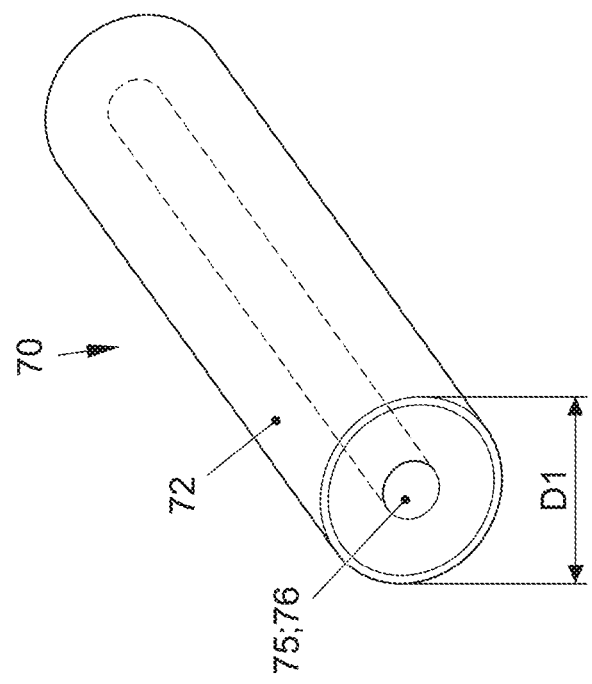
FIG. 2: a first embodiment of a conductor and output device for use in a device.

FIG. 2 shows a conductor and output device 70 for conducting and outputting laser radiation with a light guide 72 for use in a device for the generative production of at least one component. The front face of the conductor and output device 70 or the light guide 72, shown at the bottom left, serves to emit the laser radiation for the purpose of irradiating the powder. The inner region 75 of the light guide 72, an optical fiber, is designed as a glass body 76 and serves to transmit the thermal radiation emitted by the material irradiated or to be irradiated in the direction of a detection device of the device.

In an alternative embodiment, the inner region 75 of the light guide 72 is hollow. This has the advantage over the configuration in glass that the thermal radiation can also be detected in spectral ranges in which glass is not able to conduct the thermal radiation, since glass is no longer transparent in these ranges.

In other words, the inner region 75 is configured for conducting and/or transmitting thermal radiation. The conductor and output device 70 shown here is also called dual core fiber.

The light guide 72 serves to guide the laser radiation from a laser source to the material to be irradiated, at least in sections. This means that the distance to be covered by the laser radiation from the laser source to the impact point on the powder is not necessarily completely realized by the light guide 72. The light guide 72 and its inner region 75 each have coaxially arranged circular cross-sections. In this way, the thermal radiation emitted precisely by the irradiated area of the material can be directed to the detection device in order to influence the laser intensity. The respective materials of the light guide 72 and its inner region 75 have different refractive indices. The inner region 75 of the light guide is delimited by a glass surface. An outer diameter D1 of the conductor and output device 70 and/or of the light guide 72 is between 50 μm and 1000 μm. For larger systems, in particular, it is advisable to realize an outer diameter D1 in the range of 500 μm-1000 μm.

It is advantageous to realize a ratio of the diameter of the inner region 75 to the outer diameter D1, which lies between 0.3 and 0.9. In particular, it is desirable that this ratio should be between 0.5 and 0.8. This has the advantage that the thermal radiation to be measured can be reliably supplied to the detection device 62.

Figure 3:
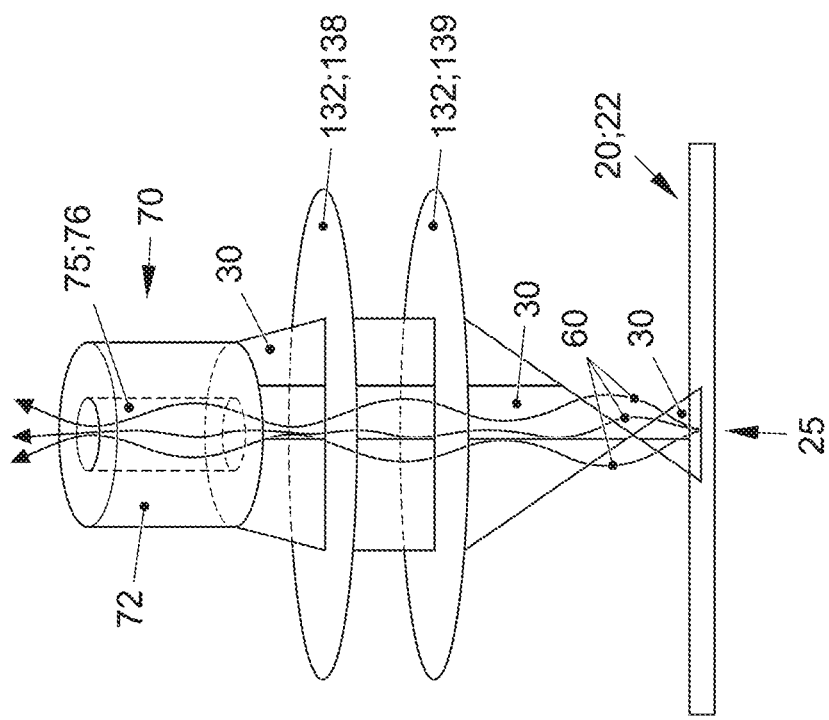
FIG. 3: a schematic representation of the function of the conductor and output device from FIG. 2, FIG. 4: a second embodiment of a conductor and output device for use in a device.

FIG. 3 schematically shows the functionality of the described conductor and output device 70. In the upper part of the figure a segment of the conductor and output device 70 is shown, which is truncated to improve the clarity of the representation. If arranged in the device for the generative production of at least one component, the light guide 72 would be connected to a laser source in the further course of the conductor and output device 70 and a detection device would be connected to the inner region 75 of the light guide 72.

It can be seen that laser radiation 30 emerges from the end of conductor and output device 70 or light guide 72, which is configured as an optical fiber. The emitted laser radiation 30 is divergent and is focused by an optical element 132, namely a first collecting lens 138, to produce a parallel beam path. The laser radiation 30 passes through a further optical element 132, namely a second collecting lens 139, and is focused. In the state shown here, the focus or focal point of the laser radiation 30 lies in front of or behind the impact point of the laser radiation 30 on a surface-forming material 22 of the powder 20, so that the laser radiation 30 is again present as a divergent laser radiation 30 at the impact point, i.e. at its impact surface on the surface. This serves to realize a soft transition between a cold core and a hot edge of the laser radiation at the impact point. Typically, an optical scanning device for guiding the laser radiation 30 over the powder 20 is arranged in the parallel beam path between the shown optical elements 132.

The irradiated area 25 is located on the side of the powder 20 facing the conductor and output device 70. The thermal radiation 60 output by the irradiated material 22 or by said area 25 passes through the optical elements 132 in the opposite direction to the laser radiation 30 and thus reaches the inner region 75 of the conductor and output device 70, which is designed as a glass body 76, where it is passed on for detection.

As an alternative to the embodiment described here, the inner region of the light guide 72 can also be configured as a hollow space or hollow core, i.e. as an air volume delimited by an inner wall of the light guide 72, a glass surface, for conducting the thermal radiation.

Figure 4:
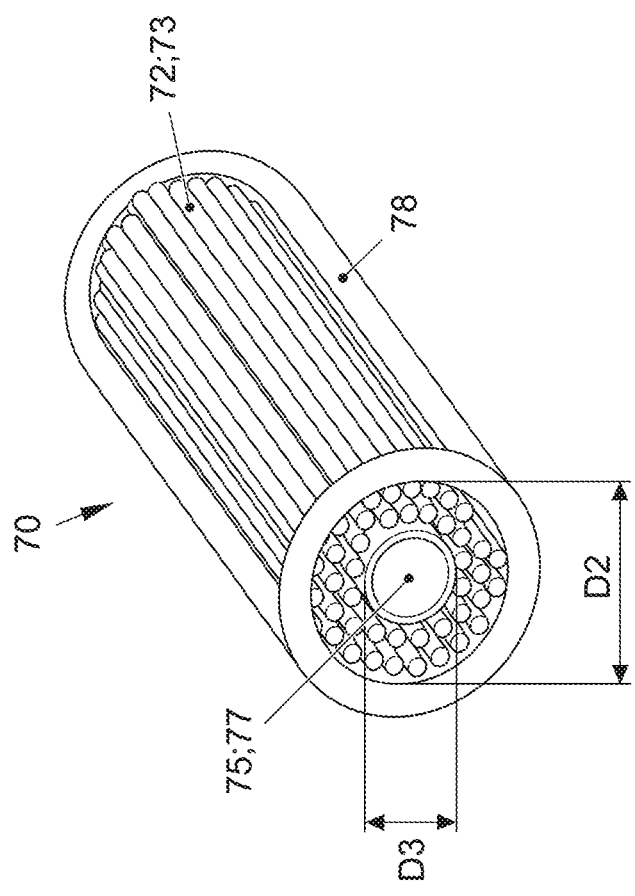

FIG. 4 shows an alternative embodiment of conductor and output device 70, in which the light guide 72 is configured as photonic crystal fiber 73. This optical fiber has fine channels or hollow spaces aligned along its light conducting direction which influence the movement of laser radiation as structures with a refractive index. In this way, laser radiation can be conducted particularly efficiently. The inner region 75 of the light guide 72 is configured as hollow space 77 or hollow core in this embodiment. The conductor and output device 70 is surrounded by a glass coating 78. The diameter D2 of the inner region 75 of the light guide 72 is about 30 μm and the diameter D3 of the light guide 72 is about 100 μm.

Figure 5:
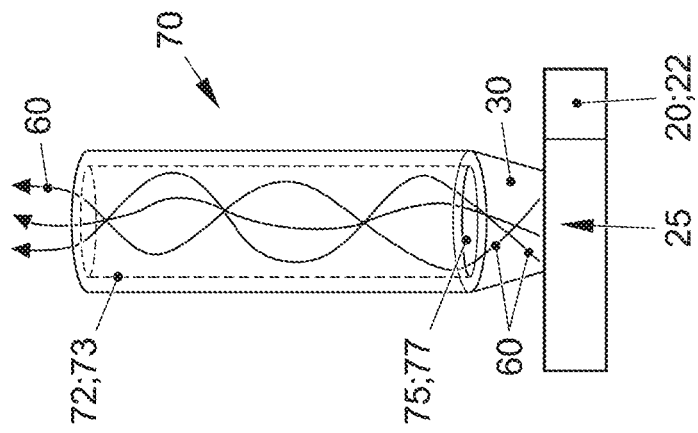
FIG. 5: a schematic representation of the function of the conductor and output device from FIG. 4, FIG. 6: a first multispot arrangement of conductor and output devices for use in a device.

FIG. 5 shows the use of the conductor and output device 70 described in FIG. 4 in a device for the generative production of at least one component. Analogous to the representation of FIG. 3, the upper part of this figure is cut off. The laser radiation 30 exits at the lower side of the light guide 72 and hits the area to be irradiated 25 of the powder 20 of the material 22. Thermal radiation 60 radiated from the area 25 enters the inner region 75 of the conductor and output device 70, which is configured as hollow space 77, in the opposite direction to the laser radiation 30 and is conducted through this in the direction of a detection device which is not shown. It can be seen that a wall of the inner region 75 is configured to reflect the thermal radiation. This can be the case with all described embodiments of the conductor and output device 70.

Figure 6:
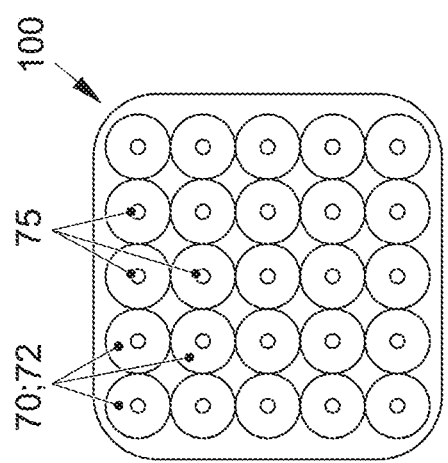

FIG. 6 shows a square multispot arrangement 100 configured as a field or array with five times five conductor and output devices 70. The individual conductor and output devices 70 can be configured analogous to FIG. 2 or 4 and thus as dual core fibers or as photonic crystal fibers with a hollow core. All conductor and output devices 70 have a light guide 72 and its inner region 75 configured for transmitting the information, wherein the light guide 72 and the inner region 75 are arranged coaxially.

Such a multispot arrangement 100 can be used, on the one hand, to irradiate an area of the powder successively in time by means of conductor and output devices 70 and/or laser sources connected to them which are arranged side by side along a first direction of expansion and thus to realize heating and/or melting of the area in several steps. This can be achieved by moving the powder along a feed direction and/or by scanning the surface with laser radiation emitted from the multispot arrangement by means of an optical scanning device. The output devices arranged side by side along a second expansion device can be used to irradiate a part of the powder simultaneously in order to cumulate the radiation powers of the laser sources connected to the respective output devices or in order to irradiate a part of the powder several times in succession by means of several laser sources when scanning the surface. As in FIG. 1, several laser sources can also be coupled into the individual conductor and output devices 70.

Figure 7:
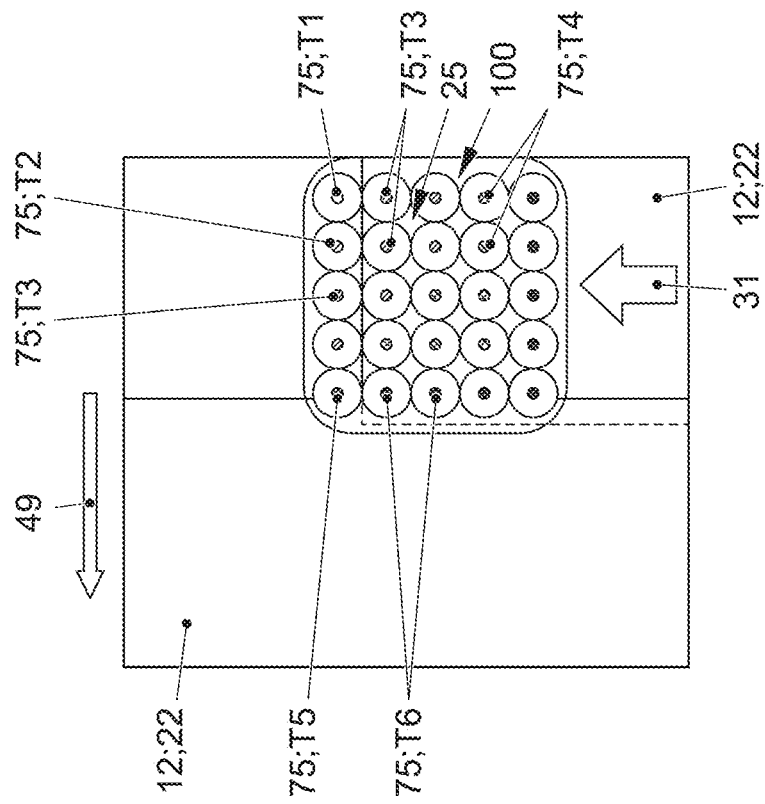
FIG. 7: a schematic representation of the use of the first multispot arrangement from FIG. 6, FIG. 8: a schematic representation of the use of conductor and output devices.

FIG. 7 shows schematically and exemplarily the use of the multispot arrangement 100 from FIG. 6 when performing a method for the generative production of at least one component. A powder of a material 22 is irradiated to produce a component 12 by means of laser radiation output from the light guides 72, so that it is heated and at least partially melted. After irradiation, the molten material 22 solidifies to at least partially form the component 12. Information relating to the temperature of the material 22 to be irradiated or irradiated, namely thermal radiation 60, is transmitted in the inner region 75 of the light guide 72 for the purpose of its detection in order to influence the laser intensity.

The temperatures T1 to T6 of the respective impact points of the individual conductor and output devices 70, measured by means of the respective thermal radiation, are shown in different hatches in the inner region 75 of the respective light guides. The first temperature T1 corresponds to a temperature range between about 750° C. and 899° C., the second temperature T2 corresponds to a range between about 900° C. and 949° C., the third temperature T3 corresponds to a range between about 950° C. and 1099° C., the fourth temperature T4 corresponds to a range between about 1100° C. and 1299° C., the fifth temperature T5 corresponds to a range between about 1300° C. and 1599° C. and the sixth temperature T6 corresponds to a temperature of about 1600° C. and possibly higher.

It can be seen that the temperature T1 at the impact point of the conductor and output device 70 shown above on the right is comparatively low, as on the one hand this impact point is located in front along the scan direction 31 of the multispot arrangement 100 and thus the material 22 located there has not yet been irradiated. On the other hand, this impact point is located at the rear along the feed direction 49 of the material 22 and has not yet been irradiated in a previously realized scan. The impact point below has a clearly higher third temperature T3, as it was irradiated immediately before by means of laser radiation, which was emitted by means of the conductor and output device 70 shown above right. The impact points further below have correspondingly higher temperatures.

The top left impact point already has a high fifth temperature T5, as it is located in the immediate vicinity of hot material 22 that has already been irradiated. Accordingly, the impact points below show even higher sixth temperatures T6. In the upper row, the temperature drops from left to right due to the diminishing influence of the already heated, previously irradiated material 22. Towards the bottom, the respective temperatures increase as described. After reaching a defined maximum temperature, for example, the laser intensity can be reduced so that the material 22 does not overheat in any area.

A scanning direction 31 is shown schematically, which describes a relative movement of the respective impact points of the light guides 72 in relation to the surface to be irradiated. During the movement of the impact points along the scanning direction 31, the material 22 is irradiated successively in time by means of laser radiation from several laser sources and at the same time as the irradiation, the thermal radiation of the respective irradiated areas is directed to a respective detection device to be detected and used to influence the laser intensity. In particular, the respective impact points are guided over the surface by means of a rotating polygon mirror or a mirror performing a pendulum movement. In particular, the configuration with an oscillating mirror represents a cost-effective variant in which the heating process can be carried out in reverse.

A plane field optic can be used for uniform irradiation of the essentially flat surface of the powder.

In addition to guiding the impact point across the surface, a linear movement of the powder along the feed direction 49 is effected. In this way, a continuous method is provided for the generative production of at least one component, in which the powder is moved relative to the light guides 72 and to applicators for applying the powder, in order to realize a continuous layer by layer production of the component.

Figure 8:
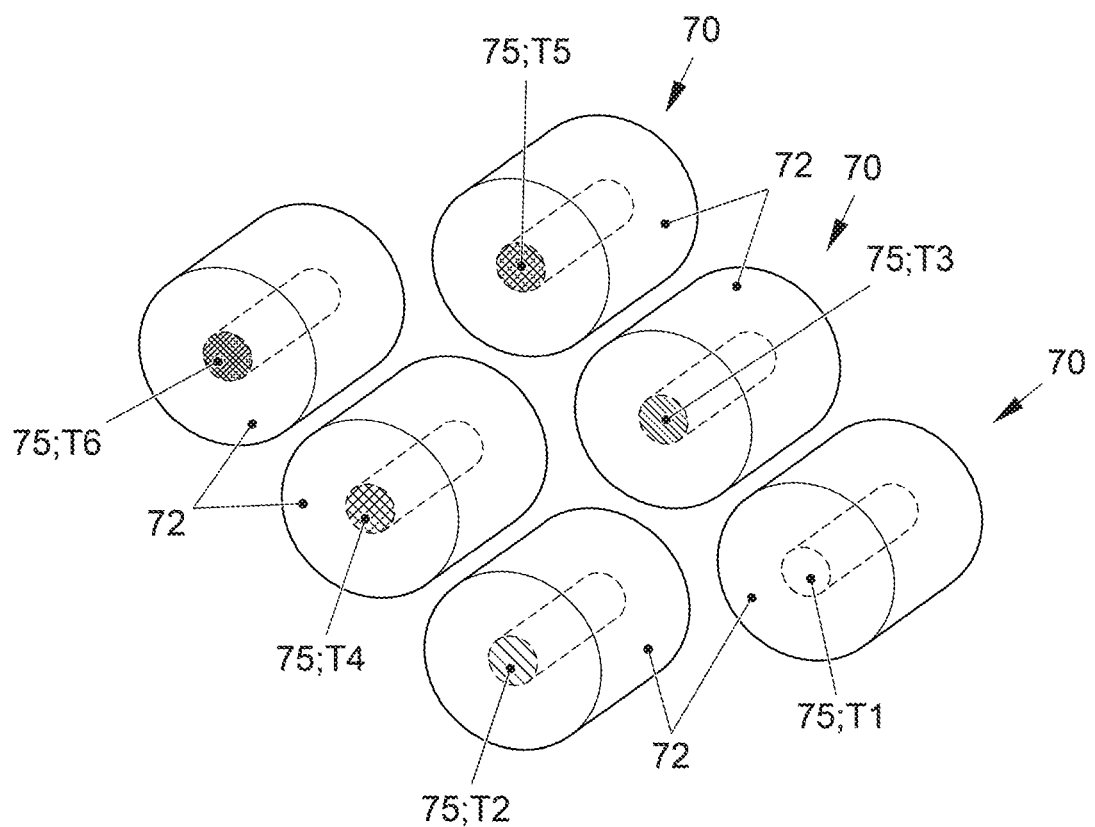

The individual conductor and output devices 70 of the multispot arrangement 100 from FIG. 7 are schematically shown in FIG. 8, whereby also here the hatchings shown in the respective inner regions 75 of the light guides 72 correspond to the above-mentioned temperature ranges of the first temperature T1 up to the sixth temperature T6.

FIGS. 9 to 12 schematically show different arrangements of light guides 72 of conductor and output devices analogous to FIG. 7. These can be used in some embodiments as an alternative to the conductor and output devices shown in FIGS. 2 and 4. In these embodiments, light guides 72, for example optical fibers, are used as conductor and output devices for conducting and outputting laser radiation.

Figure 9:
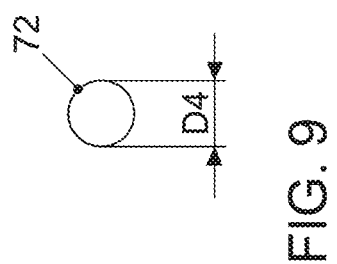
FIG. 9: a schematic representation of a light guide usable in the device.

The light guide 72 shown in FIG. 9 has a diameter D4 of 500 μm-1000 μm. It can be used to output laser radiation from an arbitrarily arranged laser source in such a way that it hits a desired position on the powder to be heated. The illustration shows a top view of one end of the light guide 72, which is configured to output laser radiation and thus serves as an output device for outputting laser radiation. This also applies to the following figures.

Figure 10:
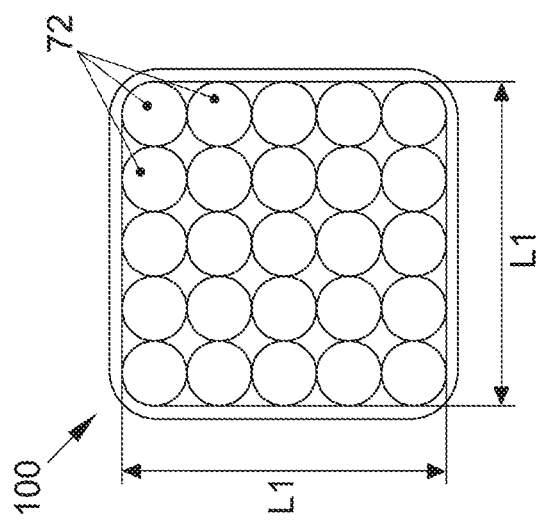
FIG. 10: a first multispot arrangement of light guides usable in the device.

FIG. 10 shows a square multispot arrangement 100 configured as a field or array with five times five light guides 72. With preferred diameters of the individual conductor and output devices in the range of 500 μm, the length L1 along both directions of expansion of the square arrangement is correspondingly 2.5 mm. Such a multispot arrangement 100 can be used analogously to the multispot arrangement 100 shown in FIGS. 6 and 7.

Figure 12:
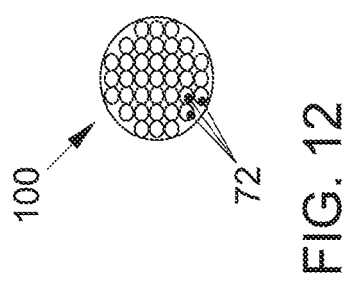
FIG. 12: a third multispot arrangement of light guides usable in the device.
Figure 11:
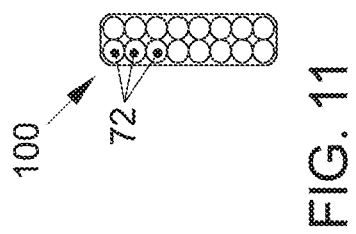
FIG. 11: a second multispot arrangement of light guides usable in the device.

Depending on the respective requirements, different arrangements of the individual light guides 72 within the multispot arrangement 100 can be chosen, so that, for example, rectangular or round shapes are provided, as shown in FIGS. 11 and 12.

Figure 13:
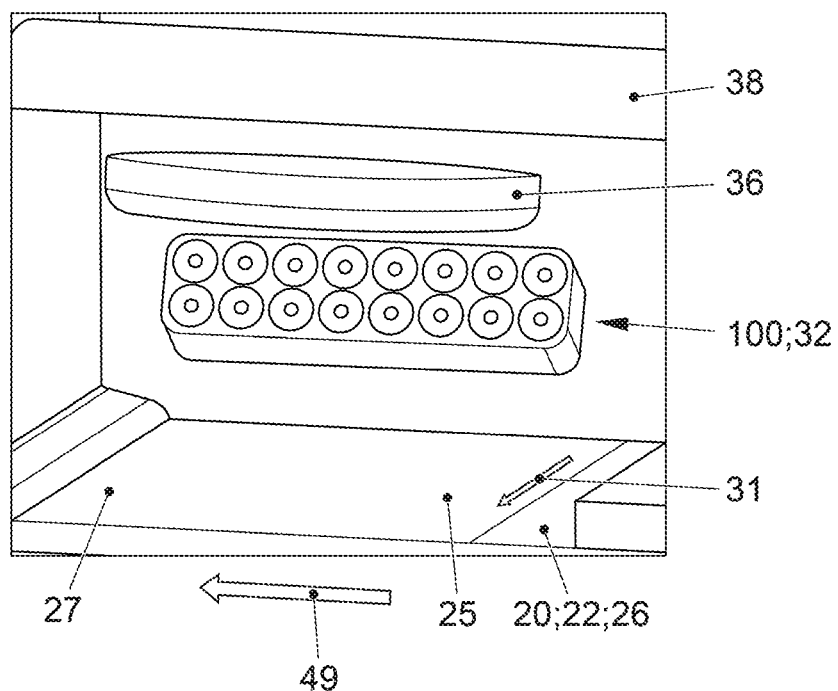
FIG. 13: a first perspective representation of a detail of a device.

FIG. 13 schematically shows a detail of a device for the generative production of a component 12. A powder 20 of a material 22 is arranged on a receiving and moving device not shown here and is moved by this along the feed direction 49. A laser unit 32 with sixteen conductor and output devices arranged in a fixed multispot arrangement 100 is arranged above and behind the powder 20. The conductor and output devices are each connected at their other ends to a laser source not shown here, which is also part of the laser unit 32. The multispot arrangement 100 is configured as a field or array with two times eight conductor and output devices, so that eight conductor and output devices each are arranged at different positions along the feed direction 49, namely one behind the other, and two conductor and output devices each are arranged at the same position along the feed direction 49, one beside the other. The diagram shows exemplary conductor and output devices according to FIGS. 2 and 4, but also those according to FIGS. 9 to 12 can be used.

In this way, the laser sources which are connected to each of the eight conductor and output devices arranged one behind the other are arranged or configured by means of the respective conductor and output devices in such a way that they are configured to output laser radiation at different positions along the feed direction 49. In this way, the area 25 of the powder 20 can be irradiated one after the other by each of the eight conductor and output devices arranged side by side as the powder 20 moves along the feed direction 49. In this way, the area 25 is heated or melted in eight steps.

With further movement along the feed direction 49, after the passage of the laser unit 32, the molten material 22 solidifies for the purpose of at least partial formation of at least one component. In this way a material layer 27 is formed.

Depending on the optical elements used, the two conductor and output devices located next to each other can be used for simultaneous irradiation of the respective part of the powder 20 in order to increase the total radiation power realized on the part of the powder 20. In addition or alternatively, they can be used to irradiate an area 25 of surface 26 successively in time by guiding the respective laser radiation over surface 26 along scan direction 31. As an alternative to the arrangement of the conductor and output devices shown here, these could also be arranged offset in a zigzag manner in order to output laser radiation in different positions one behind the other along the feed direction 49. As in FIG. 1, each of the conductor and output devices shown can be coupled to several laser sources and thus set up for conducting and outputting laser radiation emitted by several laser sources.

The device further comprises a rotating polygon mirror 38, the rotation axis of which is parallel to the feed direction 49. This is used to guide the laser radiation emerging from the respective conductor and output devices over the surface 26 of the powder 20, which is also called scanning. Thereby, an impact point of the respective laser radiation moves along a scanning direction 31 running perpendicular to the feed direction 49.

In addition, the device comprises a plane field optic 36, namely an F-theta lens, by means of which the laser radiation is deflected so that uniform irradiation of the flat surface 26 of the powder 20 can be achieved.

Figure 14:
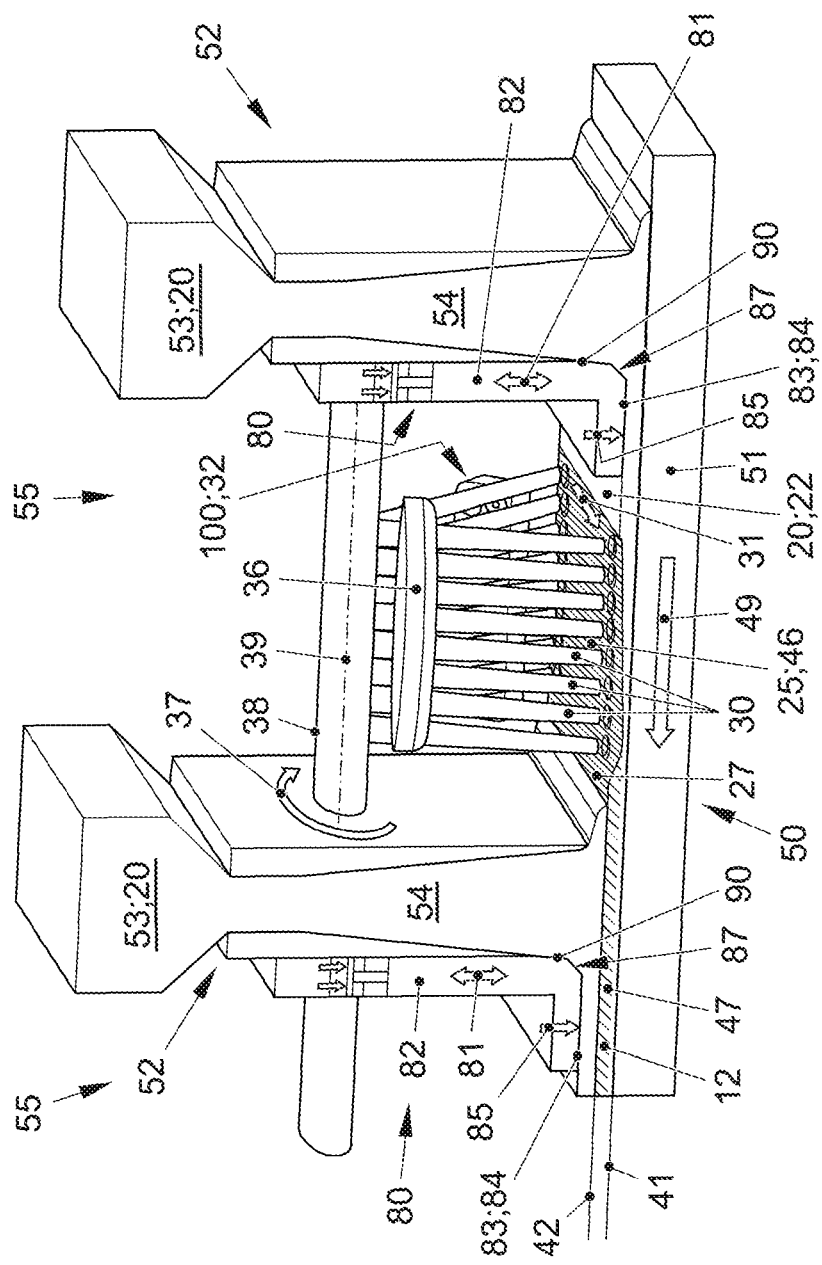
FIG. 14: a second perspective representation of a detail of the device shown in FIG. 13, and FIG. 15: a schematic representation of another embodiment of the device.

FIG. 14 shows a further detailed representation of the device for the generative production of at least one component. The detail shown in FIG. 13 is shown in the middle, whereby the laser radiation 30 output by means of multispot arrangement 100 is shown schematically. Thereby, the first and the last impact point that hits the powder 20 along the scanning direction 31, respectively, are shown.

Here, too, the plane field optics 36 and the rotating polygon mirror 38 with its rotation axis 39 aligned parallel to the feed direction 49 are shown. It rotates along the rotation direction 37.

It can be seen that the device comprises several generation devices 55 for the generative production of one material layer 27 each. Each of the generation devices 55 comprises an application device 52 for applying the powder 20 for the purpose of arranging the powder 20 on the receiving and moving device 50 or on previously at least partially melted and then solidified material. Furthermore, each generation device 55 comprises as melting device a laser unit 32 with eight laser sources for the successive irradiation of the area 25 of the powder.

The application device 52 comprises a powder tank 53 and a powder shaft 54 extending downwards from the powder tank 53 in the direction of gravity for guiding the powder onto the receiving and moving device 50 and/or onto previously at least partially melted and then solidified material. The powder shaft 54 has a continuously widening cross-section along the direction of gravity, so that blocking of the powder to be conveyed is prevented. The wall of the powder shaft 54 arranged at the front in relation to the feed direction 49 serves as a scraper 90 for scraping off excess powder in order to produce a flat powder surface.

Along the feed direction 49 behind the application device 52, as part of each generation device 55, a compacting device 80 is arranged for compaction of the applied powder 20. This serves to reduce the proportion of gas or gas mixture contained in the powder 20, so that the mechanical strength of the powder composite is increased. In other words, during compaction, gas between the powder grains is displaced or directed to the outside, thus reducing the total volume of the powder 20 or increasing its density.

The compacting device 80 comprises a movably mounted compacting member 82, also referred to as a stamp, having a compacting surface 83 arranged on the underside for exerting a force on the powder 20 along the force-exerting direction 85 which is directed vertically downwards. In this way a compacted surface of the powder 20 can be produced by means of the compacting member 82.

The compacting member 82 is configured to carry out oscillations 81 in relation to the powder 20 which are schematically shown by means of a double arrow and to introduce them into the powder 20. Thus the compacted surface of the powder 20 can be produced by repeated application of force by means of the compacting surface 83.

The compacting surface 83 extends along a horizontally aligned compaction plane 84. The compacting member 82 has an insertion surface 87 which forms an edge with the compaction plane 84 and/or an asymptotic transition of the insertion surface 87 and the compacting surface 83. This serves to compact powder 20 for the purpose of introducing powder 20 under the compacting surface 83 with a relative movement between the powder 20 and the compacting element 82 perpendicular to the force-exerting direction 85. In other words, when the powder 20 moves along the feed direction 49, the area of the compacting element 82 first impinging on the powder 20 is designed as an incline which compacts the powder 20 for the first time for an easier introduction of the powder 20 under the compacting surface 83.

This incline extends upwards from the horizontal compacting surface 83 diagonally against the feed direction 49. The compacting element 82 promotes powder inflow in the area of the powder shaft 54 by alternating between upward and downward movement in the oscillation 81, so that clumping does not occur.

This serves to compact powder 20 for the purpose of introducing powder 20 under the compacting surface 83 with a relative movement between the powder 20 and the compacting element 82 perpendicular to the force-exerting direction 85.

It can be seen that the generation unit 55 shown on the right is shown in its entirety, while the laser unit 32 is not shown on the following generation unit 55 shown on the left for reasons of clarity.

The generation unit 55 shown on the right is used to produce a material layer 27 arranged in a first plane 41 on the surface of the receiving and moving device 50, i.e. the conveyor belt. The generation device 55 shown on the left is used to produce a material layer arranged in a second plane 42 on the surface of the previously produced material layer 27 of the first plane 41. The second plane 42 runs parallel to the first plane 41 at a distance from it corresponding to the thickness of the material layer 27 and/or the corresponding powder layer. A large number of further generation devices 55 can follow in order to manufacture the component completely layer by layer in a continuous method.

When performing the method of the generative production of at least one component, a first area 46 of the powder 20, which is arranged in the first plane 41, is irradiated. At the same time, powder 20 is applied by means of the application device 52 in the second plane 42 onto a second area 47 of material 22, which is arranged in the first plane 41, has previously been at least partially melted and solidified again, and is represented to the left of the first area 46; said powder 20 is heated by means of laser radiation 30 and at least partially melted. In this way, several planes 41, 42 of the component are formed simultaneously. The powder of the first plane 41 and the powder of the second plane 42 are applied and heated in spatial and temporal proximity to each other, so that a slow and uniform cooling of the produced component can take place.

Figure 15:
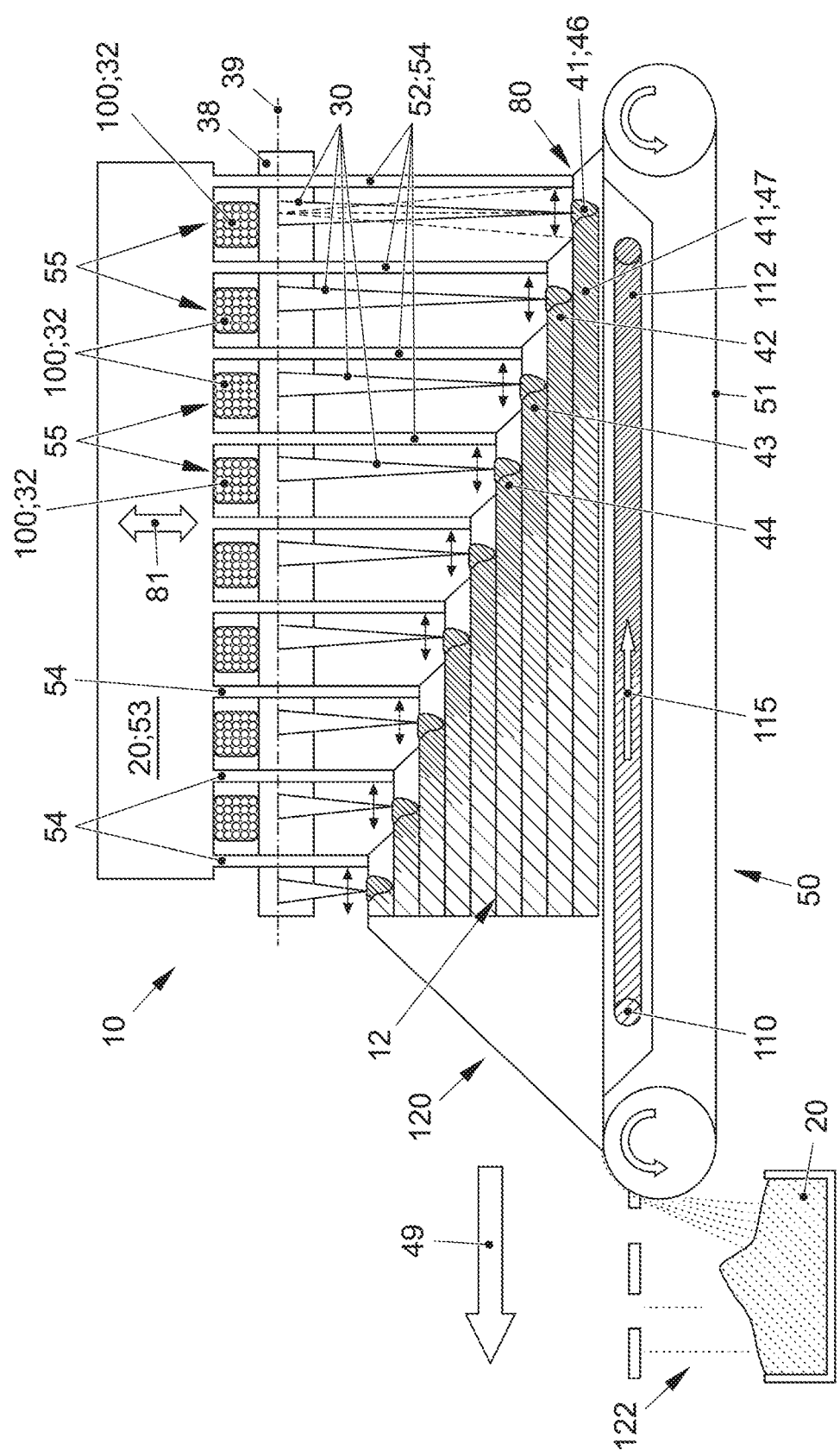

FIG. 15 shows a schematic representation of a device 10 for performing the method with nine generation devices 55, each for the generative production of a material layer of the component 12 to be produced. Of course, considerably more generation devices 55 are usually arranged in order to be able to produce components to be built up from a multitude of material layers completely with the device 10. After all material layers have been applied, the produced component 12 as well as the excess compacted powder 20 around it is transported by the conveyor belt 51 to the left side of the device 10, where it is removed in the so-called unpacking station 120 and freed from excess powder 20. This is collected in the schematically shown powder collector 122 in order to be fed back into the process.

Each generation device 55 comprises an application device 52 with a powder shaft 54. In the embodiment shown here, all powder shafts 54 are connected to a common powder tank 53 from which they are fed with powder 20 to be applied. The application device 52 of the first generation device 55 shown on the right is used to apply the powder 20 to the receiving and moving device 50, namely the metallic conveyor belt 51, for the purpose of producing the material layer arranged in the first plane 41. The following applicators 52 serve to apply the powder onto the previously produced layers of material in order to produce the layers of material arranged in the second plane 42, the third plane 43, the fourth plane 44, etc. It can be seen that at the same time as the first area 46 of the material layer arranged in the first plane 41 is produced by the first generation device 55, powder is applied by the second application device 52 to a second area 47 of the material layer previously produced by the first generation device 55 and arranged in the first plane 41 and irradiated by the second laser spot arrangement 100. Thus the first generation device 55 serves to produce the layer of material arranged in the first plane 41, the second generation device 55 serves to produce the layer of material arranged in the second plane 42, etc.

Along the feed direction 49 behind a respective applicator 52 there is a respective laser unit 32, comprising a multispot arrangement 100 and laser sources connected to respective light guides 72 of the multispot arrangement 100, which are not shown here. The multispot arrangement 100 is, for example, configured analogously to that shown in FIG. 6 or FIG. 8 and serves the purpose described there.

The laser radiation 30 shown as a triangle is intended to schematically indicate that the respective laser radiation of the light guides which are respectively arranged at the same positions along the feed direction 49 is superimposed. The dotted lines and double arrows in the area of the laser beams 30 shown on the right indicate that the angle in the area shown here can be controlled or adjusted by means of the rotating polygon mirror 38 by means of suitable optical elements simultaneously with the movement of the powder along the feed direction 49 and with the guidance of the respective impact points of the laser sources over the surface to be irradiated along a direction perpendicular to the feed direction, in order to achieve scanning of the surface along parallel paths. In addition, parameters of the laser radiation 30 such as impact points can be adapted to the respective requirements by suitable configuration of optical elements. The rotating polygon mirror 38 with its rotation axis 39 is also shown schematically.

A cooling device is arranged below the upper side of the conveyor belt 51, which moves along the feed direction 49, into which cold water 110 is fed, in which cold water 110 flows along a flow direction 115 against the feed direction 49 and in the process is heated as a result of the emitted heat of the melted layers and is subsequently removed as hot water 112 in the right-hand region of the representation. This serves to influence the temperature and in particular to ensure uniform cooling of component 12. In this context, it is evident that the temperature of the component to be produced and/or the multi-layer arrangement is highest on the right-hand side and decreases along the feed direction 49.

Each generation unit 55 also includes a compacting device 80 for compacting the applied powder to reduce the amount of gas or gas mixture contained in the powder 20 to increase the mechanical strength of the powder 20. In this embodiment, the entire powder tank 53 is configured to perform oscillations 81 or vibrations to introduce them into the applied powder by means of respective compacting elements 82 (not shown) to produce a compacted surface of the powder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the generative production of at least one component, the method comprising:
   irradiating, by laser radiation, a powder of a material so that the powder is heated and at least partially melted into a molten material that then solidifies in order to at least partially form the component,
   wherein thermal radiation of the material irradiated, which provides information relating to a temperature of the material irradiated, is detected and used for influencing a laser intensity,
   wherein the laser radiation is conducted at least in sections to the material by a light guide and the thermal radiation, which provides the information relating to the temperature, is transmitted in an inner region of the light guide,
   wherein the light guide is cylindrical-shaped having a circular cross-section with an outer region that surrounds the inner region, such that the outer region and the inner region are arranged coaxially, wherein the outer region has a different structure than the inner region, and wherein the laser radiation is conducted through the outer region, while the thermal radiation is transmitted through the inner region.

2. The method for the generative production of at least one component according to claim 1, wherein the detection of the thermal radiation and the irradiation of the material take place simultaneously at least for certain periods of time.

3. The method for the generative production of at least one component according to claim 1, wherein the material is irradiated simultaneously or successively in time at least for certain periods of time by respective laser radiation of at least two laser sources, and the thermal radiation, which provides information relating to the temperature of the respectively irradiated material, is detected and used for influencing the respective laser intensity of the at least two laser sources simultaneously with the irradiation at least for the certain periods of time.

4. The method according to claim 1, wherein the outer region of the light guide is an optical fiber and the inner region of the light guide is a hollow space of the optical fiber, and wherein an exterior of the optical fiber is provided with a glass coating.

5. The method according to claim 1, wherein a wall of the inner region of the light guide reflects the thermal radiation so as to transmit the thermal radiation.

* * * * *